Figure 1:
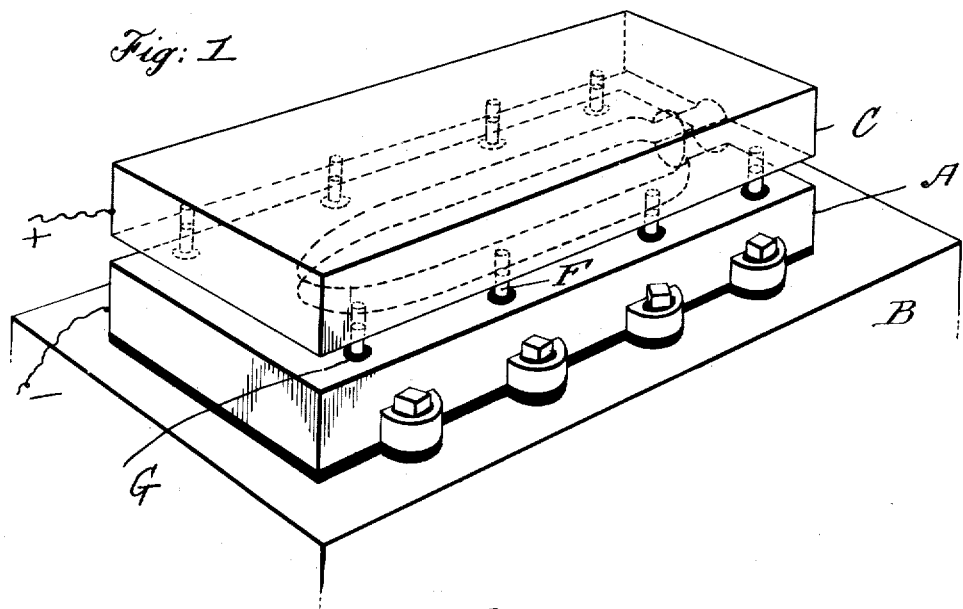

T. E. & J. B. MURRAY.
METHOD OF AND APPARATUS FOR ELECTRIC WELDING.
APPLICATION FILED MAR. 9, 1918.

1,267,259.

Patented May 21, 1918.

INVENTORS
Thomas E. Murray
Joseph B. Murray
BY
Daw Benjamin
their ATTORNEY

UNITED STATES PATENT OFFICE.

THOMAS E. MURRAY AND JOSEPH B. MURRAY, OF NEW YORK, N. Y.

METHOD OF AND APPARATUS FOR ELECTRIC WELDING.

1,267,259. Specification of Letters Patent. Patented May 21, 1918.

Application filed March 9, 1918. Serial No. 221,394.

*To all whom it may concern:*

Be it known that we, THOMAS E. MURRAY and JOSEPH B. MURRAY, citizens of the United States, residing at New York, in the county of New York and State of New York, have invented a certain new and useful Improvement in Methods of and Apparatus for Electric Welding, of which the following is a specification.

The invention is a method and an apparatus for electric welding.

We have found that when two objects of thin metal—such as sheet metal—are placed in suitable electrodes in order to hold edges of said objects in contact registry, to weld such edges together, and when such welding is effected in a very brief time interval by means of a current of extremely high ampere strength, a lateral displacement of said edges occurs, so that a portion of one edge protrudes beyond the other edge. In uniting two longitudinal half sections of a cylinder of sheet metal, for example, this displacement occurs at both edges, and may generally be illustrated in Figure 3 of the accompanying drawings, in which the electrodes are shown at A and C and the half sections to be welded at D and E. In this instance the edges of said sections are out of registry, with the edges of section D outwardly protruding beyond those of section E, as shown at a.

This is objectionable for several reasons, among which are the reduction of contact area at the joint and consequent increased concentration of the current, with possible deleterious effect upon the metal, and the deformation of the shape of the welded object because of the ridge or shoulder formed on its outer surface and the departure therefrom from a truly cylindrical form. This last is very serious, when, as we describe hereinafter, the welded objects are parts of a projectile which is required to fit the bore of a gun, and which, besides, should everywhere present a uniform resistance to the bursting charge. Such uniform strength is evidently not attained when by reason of the edge displacement the thickness of the wall is reduced, and the wall, therefore, weakened at the welded joint. Where extremely high ampere currents are used in very brief time periods, as set forth in the pending applications of Thomas E. Murray, Jr., Serial Nos. 215,710 and 215,711, filed February 6, 1918, the physical characteristics of the metal at the weld are the same as elsewhere, so that the strength of the metal is unimpaired. Hence a displacement which reduces the thickness of the metal at the weld tends to counteract the advantage gained.

In seeking to overcome this difficulty, we have found that mechanical guides exterior to the movable electrode designed to prevent its lateral displacement are not efficacious— the edge displacement continuing despite every care in construction and adjustment of said guides.

In dealing with this problem we reached the provisional hypothesis that the cause might lie in some unequal lateral expansion of the electrodes due to the sudden heating thereof by the heavy current, or possibly the expansion of one before that of the other in the almost infinitesimal duration of the current, and the setting, so to speak, of the parts due to the cooling before any contraction back could occur. Any slight or accidental difference in the physical character of the metal of the respective electrodes might account for such inequality; so also might differences in heat conduction of one of them if one electrode rested flat on the table, while the other was supported by a rod. In testing various ways for counteracting this possible relative expansion, we were led to the further conclusion that means would have to be applied to both electrodes and in a multiplicity of places around the objects to be welded, so that the electrodes would be prevented from expanding as unit masses: or, in other words, so that each preventive means should counteract the change in a certain fractional area of the mass. Following this, we constructed the device herein disclosed, which—whether the above reasoning be correct or not—solves the problem. We are now making projectiles of sheet metal in the apparatus herein set forth by welding together at their edges longitudinal half sections, with no perceptible displacement of said edges, and we are using a current of 30,000 amperes to the square inch, continuing for something less than a second.

In the accompanying drawings—

Figure 2:
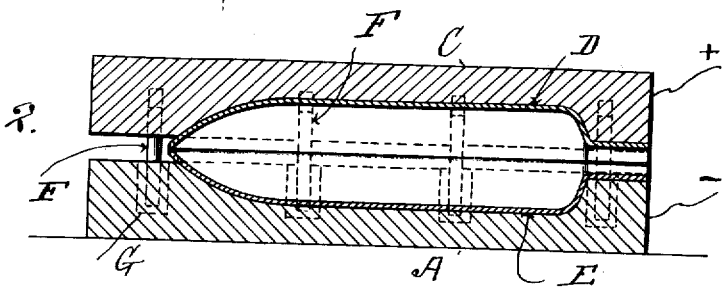
Figure 3:
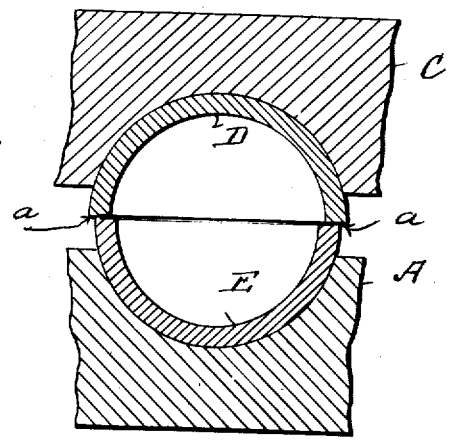

Fig. 1 is a perspective view of our welding electrodes. Fig. 2 is a longitudinal vertical section thereof. Fig. 3 is a transverse section through a portion of the electrodes and the objects to be welded, designed to illustrate a relative displacement of the edges of said objects.

Similar letters of reference indicate like parts.

A is an electrode of metal, supported upon and insulated from any suitable table B. C is the opposing electrode, which is supported in any suitable way above the electrode A so that it can be moved toward and from said electrode A. In each electrode is formed a recess of suitable shape to receive one of the objects to be welded together. In the present case, said objects are two half sections D, E of a projectile of the shape illustrated. One section E is seated in the recess in electrode A, with its longitudinal edge projecting above the upper surface of said electrode. The other section D is placed with its corresponding edge in contact and registering with the edge of section E, and its body portion seated in the recess in the upper electrode C. In the electrode C, we form a number of openings, in which are secured metal pins F which extend downwardly and enter sockets in lower electrode A, which openings have linings G of insulating material. The pins are disposed, as shown, in rows parallel to the longitudinal axis of the recesses in the electrodes. In the drawing we show four pins in each row, said pins being equidistantly spaced, but any desired number of pins may be used.

When the work is in place in the recesses, as shown in Fig. 2, the upper electrode C is separated from the lower electrode A, so that the welding current traverses only the sections D, E, and so causes a welding together of the contacting longitudinal edges thereof. Suitable downward pressure may be applied to movable electrode G.

We are, of course, aware that wooden and other bodies have been united by dowel pins on one entering holes in the other, and that such pins will act as guides as the bodies are brought together; but we are not aware that there exists in the prior art any solution of the difficult problem in electric welding above noted, or that the consequent new result—namely, accurately registered welded edges of thin metal—has been accomplished prior to our present invention.

We claim:

1. The method of preventing lateral relative displacement of electrically welded edges of thin metal objects, which consists in placing said edges in contact registry, establishing welding current between said edges, and simultaneously preventing relative lateral expansion of said holding electrodes.

2. The method of preventing lateral relative displacement of electrically welded edges of thin metal objects, which consists in placing said edges in contact registry while held in electrodes, establishing welding current between said edges, and simultaneously preventing relative lateral expansion of said holding electrodes at a plurality of points encompassing the work and disposed on the facing surfaces of said electrodes.

3. An apparatus for electric welding, comprising two electrodes, and means for simultaneously preventing lateral expansion of both of said electrodes during the welding operation.

4. An apparatus for electric welding, comprising two electrodes, one movable with respect to the other, and means uniting the opposing faces of said electrodes for simultaneously preventing lateral expansion of said electrodes during the welding operation.

5. An apparatus for electric welding, comprising two electrodes, one movable with respect to the other, a plurality of devices for uniting said electrodes disposed at a plurality of points encompassing the work, each of said devices coöperating with both of the opposing faces of said electrodes.

6. An apparatus for electric welding, comprising two electrodes, one of said electrodes being movable with respect to the other, and means for uniting said electrodes at a plurality of points encompassing the work and disposed opposite to one another on the respective facing surfaces of said electrodes.

7. An apparatus for electric welding, as in claim 6, comprising a plurality of pins secured on the face of one electrode coöperating with sockets on the face of the opposite electrode, the said pins and sockets being disposed at points encompassing the work.

In testimony whereof we have affixed our signatures in presence of two witnesses.

THOMAS E. MURRAY.
JOSEPH B. MURRAY.

Witnesses:
GERTRUDE T. PORTER,
MAY T. McGARRY.